United States Patent [19]

Plumb et al.

[11] 4,322,397
[45] Mar. 30, 1982

[54] PROCESS FOR CHANGING THE MORPHOLOGY OF METAL SULFATES

[75] Inventors: Robert C. Plumb, Marlboro; Rewat Tantayanon, Worcester, both of Mass.

[73] Assignee: Worcester Polytechnic Institute, Worcester, Mass.

[21] Appl. No.: 244,332

[22] Filed: Mar. 17, 1981

[51] Int. Cl.³ ............... C01B 17/96; C01F 11/46; C01G 3/10; B01J 35/00
[52] U.S. Cl. ............................. 423/544; 423/554; 423/557; 23/293 R; 264/123; 252/477 R
[58] Field of Search ............ 23/293 R, 293 A; 423/554, 557, 544; 264/123; 126/430, 400, 436; 252/477 R

[56] References Cited

U.S. PATENT DOCUMENTS

| | | | |
|---|---|---|---|
| 1,561,971 | 11/1925 | Coffin et al. | 23/293 A |
| 3,420,682 | 1/1969 | Gensler | 423/554 |
| 3,454,357 | 7/1969 | Rhees et al. | 423/279 |
| 4,241,782 | 12/1980 | Schoenfelder | 126/436 |
| 4,271,029 | 6/1981 | Lane et al. | 126/400 |

FOREIGN PATENT DOCUMENTS 393332  6/1933  United Kingdom ............ 23/293 A

*Primary Examiner*—Gary P. Straub
*Attorney, Agent, or Firm*—Blodgett & Blodgett

[57] ABSTRACT

Novel form of metal sulphate produced by alternate dehydration and rehydration, e.g., by cycling prismatic metal sulphate between 0° C. and 70° C., 20 minutes at each temperature, for 200 or more cycles, until a low-density powder is formed having a coral-like morphology at 8000 magnification.

11 Claims, 5 Drawing Figures

$MgSO_4 \cdot 3.96 H_2O$
AFTER CYCLING
8,000 X

MgSO₄·3.96H₂O
BEFORE CYCLING 2,200 X

MgSO₄·3.96H₂O
AFTER CYCLING 3,600 X

MgSO₄·3.96H₂O
AFTER CYCLING 8,000 X

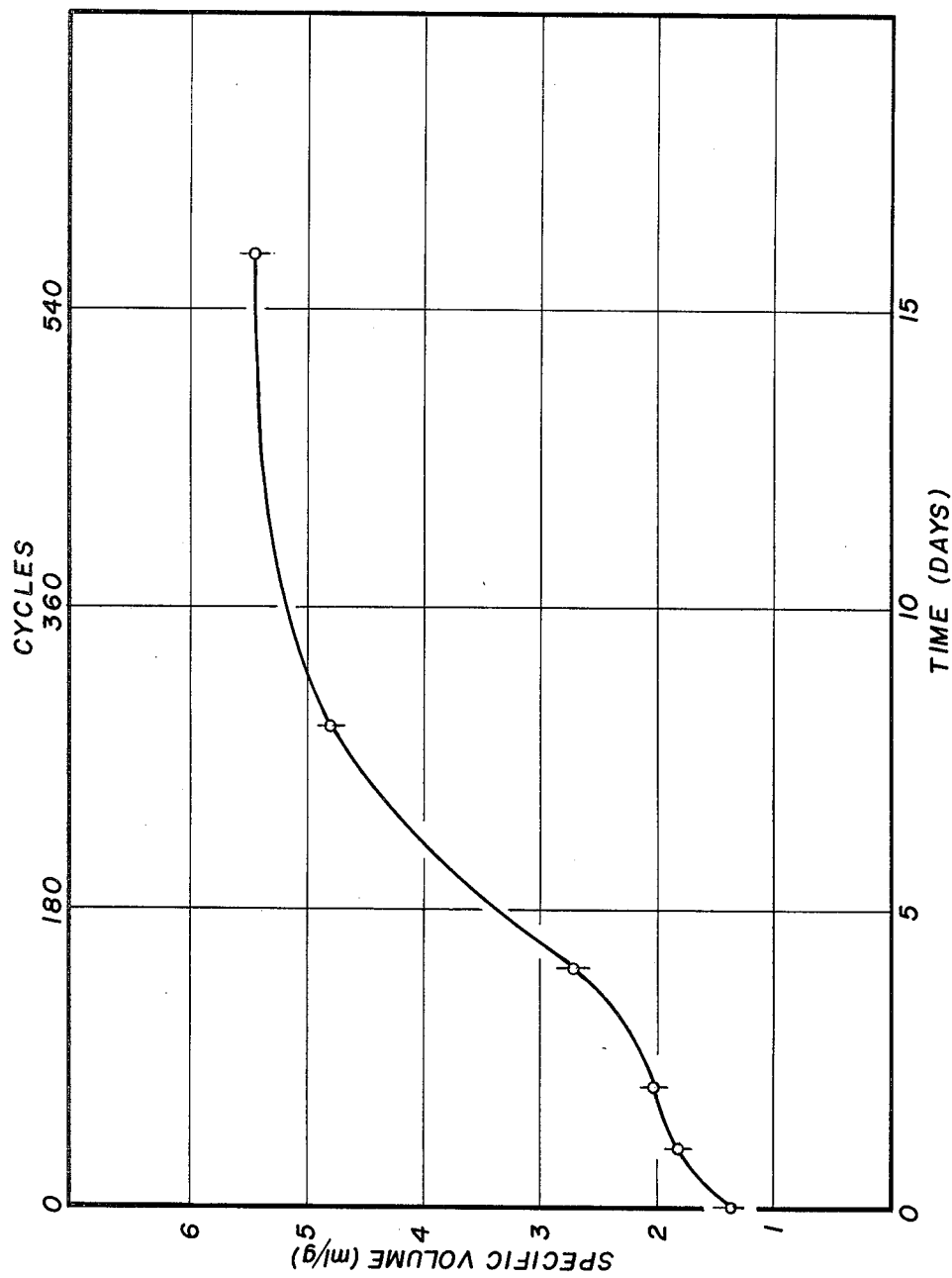
Fig.5 MgSO₄·3.96 H₂O cycled in 50 torr CO for different periods of time

PROCESS FOR CHANGING THE MORPHOLOGY OF METAL SULFATES

BACKGROUND OF THE INVENTION

Metal sulphates and, in particular, magnesium sulphate, exist in a number of hydrated forms. Common degrees of hydration are the heptahydrate, the hexahydrate, the pentahydrate, the monohydrate, and the anhydrous form. The particles of metal sulfate have a crystalline morphology, i.e., prismatic shapes. Sometimes these crystals are large and well developed; other times the crystals are small and the materials are powder-like. The bulk densities of these materials are approximately independant of the particle size and of the order of 30–50% less than the single crystal density, the decrease in density resulting from the voids between adjoining crystals.

It is an outstanding object of this invention to provide a porous form of metal sulphate having a very high surface area per unit volume, having a very low bulk density, and being suitable for use as a catalyst, catalyst support, or other chemical reagent where the finely-divided nature of the material would provide unique properties.

As will be apparent to those skilled in the art, the invention resides in the combination and arrangement of steps in the details of the composition hereinafter described and claimed, it being understood that changes in the precise embodiment of the invention disclosed may be made within the scope of what is claimed without departing from the spirit of the invention.

SUMMARY OF THE INVENTION

This invention has to do with a novel form of metal sulphate having a coral-like morphology, having a very high surface area per unit bulk volume, and having a very low density. The novel material is formed by exposing normally-crystalline metal sulphates to cycles of hot and cold temperature, thereby alternatively hydrating and dehydrating the metal sulphate. After repeated cycles (e.g. 200 cycles) of 20 minutes at each temperature, the morphology of the metal sulphate is transformed from crystalline to coral-like and the particle size is substantially reduced. The novel material is suitable as a catalyst, as a catalyst support, or other chemical reagent where the finely-divided nature of the material would provide unique properties.

BRIEF DESCRIPTION OF THE DRAWINGS

The character of the invention, however, may be best understood by reference to the accompanying drawings, in which:

FIG. 5 is a graphical representation of the change in specific volume of magnesium sulphate as a function of cycling as set out in the present invention.

Figure 1:
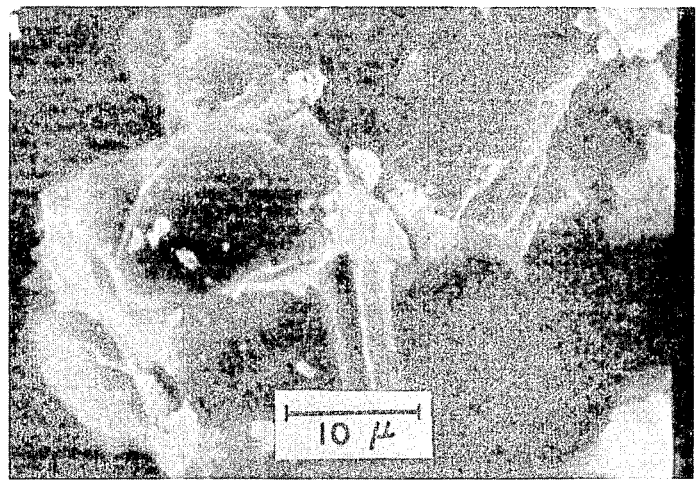
FIG. 1 shows a photomicrograph of crystalline magnesium sulphate at 2200 magnification.
Figure 2:
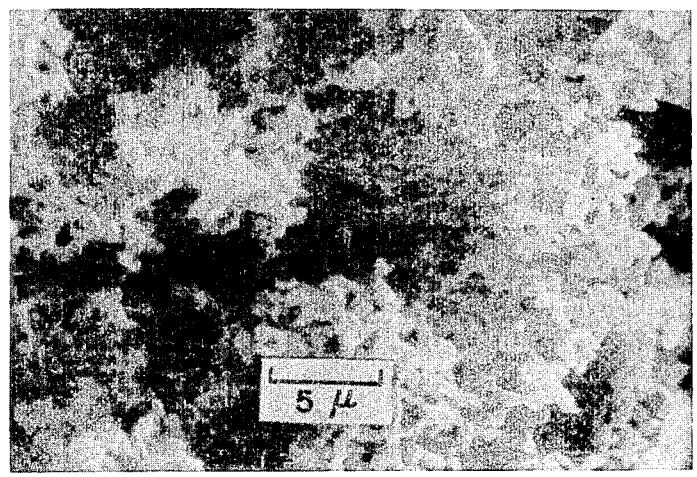
FIG. 2 shows a photomicrograph of the product of the present invention at 3600 magnification.
Figure 3:
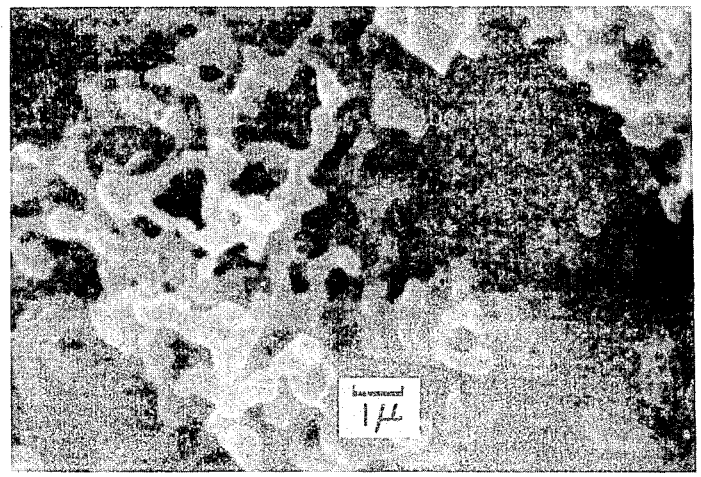
FIG. 3 shows a photomicrograph of the product of the present invention at 8000 magnification.
Figure 4:
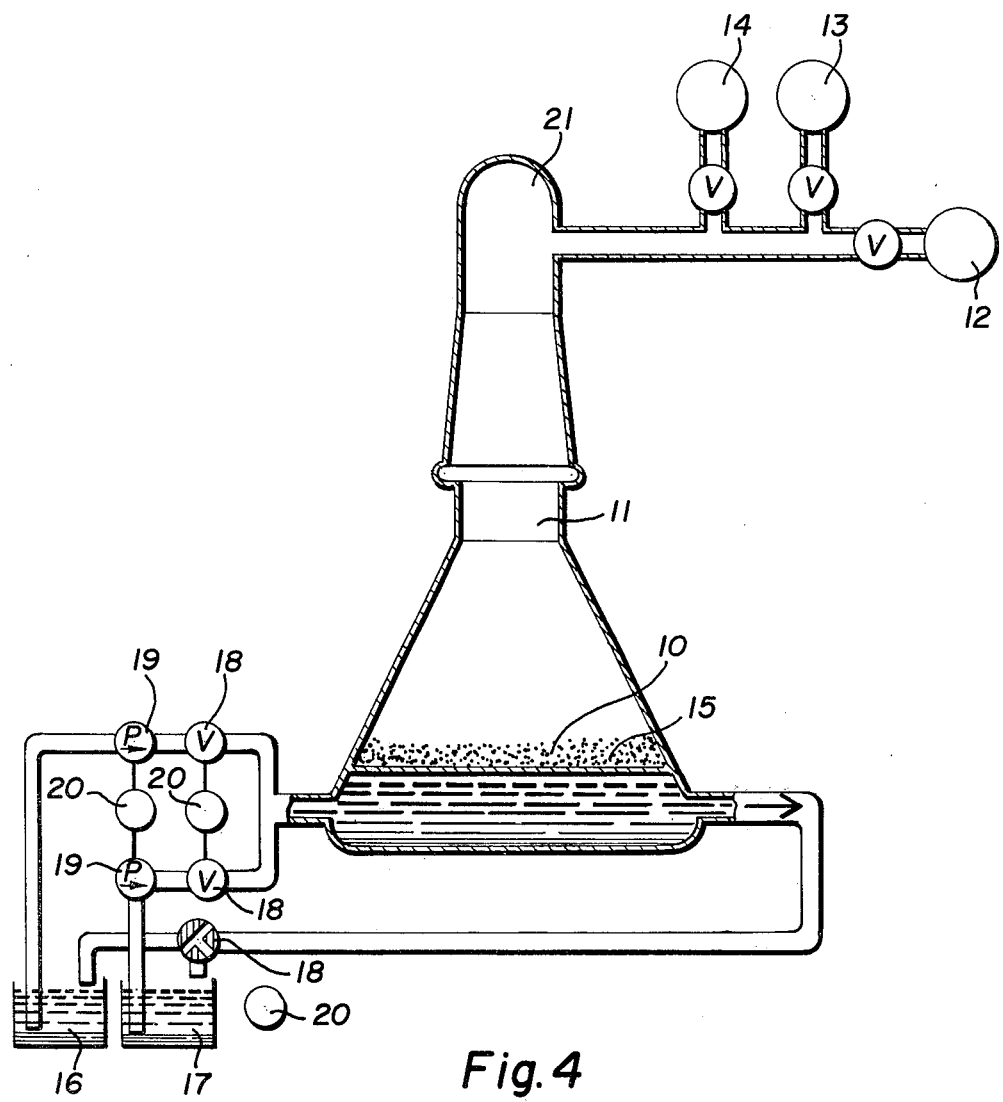
FIG. 4 is a schematic diagram of the apparatus used to produce the novel compound of the present invention.

DESCRIPTION OF THE PREFERRED EMBODIMENT 2.00 grams of $MgSO_4.7.0H_2O$, denoted by numeral 10, (prepared by equilibration of commercial magnesium sulfate heptahydrate with the water vapor in equilibrium with a saturated solution of magnesium sulfate) was vacuum dried at room temperature, using vacuum pump 12 in a cell 11 similar to that shown in FIG. 4 to a composition of $MgSO_4.3.96H_2O$. 10 torr of helium was added to the cell from gas tank 13. The pressure was followed on pressure gauge 14. The cell base 15 was cycled between 0° C. and 70° C. with 20 minutes at each temperature for more than two weeks. A constant temperature cold bath 16, a hot bath 17, electrically operated solenoid valves 18, circulating pumps 19, and timers 20 provided the cycling action. During the hot cycle, moisture was released from the magnesium sulfate and condensed on the upper part 21 of the cell. It then recondensed onto the magnesium sulfate and rehydrated the salt during the cold part of the cycle. During the first few hours of cycling, only a small amount of water evolved, but after a few days the process speeded up and more water cycled. The water was completely reabsorbed during the cold part of the cycle. The powder gradually expanded, becoming very fluffy after a few days. After two weeks the powder was removed and 1.5 grams of powder was placed in a graduated cylinder beside another graduated cylinder containing 1.5 grams of magnesium sulfate which had been dehydrated to 4 $H_2O$, but which had not been cycled. The cycled material had about seven times the volume of the uncycled material, indicating that a transformation in structure had taken place. The cycled powder was loose, free flowing, and, to the naked eye and at optical magnifications, indistinguishable from the uncycled material. There had been no set change in hydration during the cycling process. X-ray powder patterns on the two materials indicated that there was no crystallographic modification. It was suspected that there had been a major morphological transformation, because of the major change in the bulk density. Scanning electron microscopy revealed this to be the case. The uncycled material is shown in FIG. 1 and the cycled powder is shown in FIGS. 2 and 3. A striking change had taken place. The crystals had been transformed to an open coral-like structure with ~3000Å pores and fibers.

Table 1 gives the density, specific volume and molar volume of our expanded magnesium sulfate, powdered magnesium sulfate, and crystalling magnesium sulfate. The volume ratio of the expanded magnesium sulfate to powdered magnesium sulfate is about 6.9:1. The transformation of $MgSO_4.4H_2O$ requires electron microscopy to observe. Light microscopy at even high magnification does not reveal the structure. The bulk densities, of course, can be used to gauge the extent of the transformation without microscopy.

TABLE I

Powder Densities of Expanded and Powdered $MgSO_4 . H_2O$

| | Expanded Form $MgSO_4 . 4H_2O$ | Powdered Form $MgSO_4 . 4H_2O$ | Crystalline Form $MgSO_4 . 4H_2O$* |
|---|---|---|---|
| density (g/ml) | .14 | .94 | 2 |
| specific volume (ml/g) | 7.3 | 1.07 | .5 |
| molar | | | |

TABLE I-continued
Powder Densities of Expanded and Powdered MgSO$_4$ · H$_2$O

| | Expanded Form MgSO$_4$ · 4H$_2$O | Powdered Form MgSO$_4$ · 4H$_2$O | Crystalline Form MgSO$_4$ · 4H$_2$O* |
|---|---|---|---|
| volume (ml/mole) | 1400 | 206 | 100 |

It should be pointed out that the partial dehydration of the magnesium sulfate heptahydrate is necessary before the process which we have described will take place. Fully hydrated magnesium sulfate heptahydrate does not undergo the morphological transformation, at least under conditions used.

It was found that other metal ions, which could affect the catalytic activity, by doping, could be incorporated in the magnesium sulfate prior to the expansion of the powder.

For example, magnesium sulfate 4 H$_2$O containing 5% by weight of aluminum sulfate was successfully expanded. Both ferric and ferrous sulfate can also be incorporated in the magnesium sulfate. Catalytic activity depends upon the strength of the Lewis acid sites on a catalyst surface and by incorporating different metal ions in the lattice, the catalytic properties can be varied.

It was desired to establish the stability of the morphologically transformed magnesium sulfate to changes in hydration. For example, could the magnesium 4 H$_2$O, in the expanded form, be dehydrated with the expanded structure intact or would it revert to a new form? It was found that dehydration can take place down to 1.1 H$_2$O without change in morphology or density, but the crystal structure was changed. Similarly, we have been able to rehydrate the expanded 4 H$_2$O up to 5 H$_2$O and 6 H$_2$O keeping the morphology unchanged.

The rate at which water is lost and reabsorbed during the cycling process has some (but not a major) effect upon the morphological transformation. To study this, magnesium sulfate 4 H$_2$O was cycled for the same period of time and with the same temperature conditions in two different atmospheres. In one case, the only gas present was the water vapor and, in the second, the water vapor was transported through an atmosphere of 100 torr of helium. In the absence of helium as a buffer gas, the water was transported from the powder to the top of the cell and back again within two or three minutes after the beginning of the hot and cold phases of the cycle. With helium present the water transport was much slower, not being complete until about 15 minutes through each phase of the cycle. The structures produced were very similar. The particle size was just about the same. However, the bulk volume of the magnesium sulfates cycled in the helium atmosphere was greater by a factor of 1.5. The difference between the two samples appears to be in the uniformity of the fine powder. Scanning electron microscope pictures of the powder cycled in the absence of a buffer gas, where the water was condensing more rapidly and evaporating more rapidly, show a significant number of agglomerates. Thus it appears that slow water transport produces a more uniform fine powder and that high supersaturations are not responsible for the morphological transformation.

Atypical products, such as agglomerates, appear to result from condensation on cell walls followed by wetting of the powder. They do not form in the presence of a buffer gas.

In order to determine how the growth rate depends upon the cycling time, and to get information as to the mechanisms which are involved, a series of cells were set up with the same starting material, the same temperature conditions and the same cycling frequency but with cycling times of 16, 8, 4, 2, 1 and 0 days. The specific volumes of the powders produced are shown in FIG. 5. The inflections in the graph are thought to be real, that is, the initial growth is more rapid, then the rate decreases then it increases again and finally levels off after, of the order of, 15 days or 500 cycles. The probable reason for this, after considering pictures obtained on a scanning electron microscope of the powder from the early stages of cycling, suggest that the initial crystals undergo a surface reaction on cycling, with gradual conversion of the larger crystals into the new morphological form. One sees the new morphological form appearing in selected areas on, and within crevices in the original crystal before complete conversion. The original crystals are gradually consumed and converted to the expanded form. It should be noted at this stage that the powder and the original crystals have the same composition, namely 4 H$_2$O. There are, of course, variations in the degree of hydration during the cycling process. However the crystal structure, as determined by X-ray, of the original powder is the same as the crystal structure of the new morphological form after all of the powder has been converted to the expanded form. It is suspected that the inflections in the growth curve result from the rapid initial conversion of the finest powder into the new morphological form and then the slower conversion of the larger particles of the powder during later stages in the cycling period.

The catalytic activity of the novel form of magnesium sulfate was tested by injecting lactic acid into a reaction chamber at 15° C. and gaseous reactions were observed. When the reaction chamber contained no catalyst or contained regular powdered magnesium sulfate, no reaction products were observed. When the reaction chamber contained pure magnesium sulfate in the novel form, a detectable reaction occurred. When the reaction chamber contained magnesium sulfate doped with a mixture of iron (II) and iron (III), carbon dioxide, carbon monoxide and acetaldehyde were released. Each chamber contained sodium bisulfate to control acidity.

Other sulfates capable of profiting by the present process are partially dehydrated copper, nickel, and cobalt sulfates. Partially dehydrated aluminum sulfate, however, does not change morphology when subjected to the process described. For the purpose of the present case, the expression "Class A metal sulfates" is used to indicate magnesium, copper, nickel, and cobalt sulfates.

While it will be apparent that the illustrated embodiments of the invention wherein disclosed are well calculated adequately to fulfill the objects and advantages primarily stated, it is to be understood that the invention is susceptible to variation, modification, and change within the spirit and scope of the subjoined claims.

The invention having been thus described, what is claimed as new and desired to secure by Letters Patent is:

1. A process for altering the morphology of an initial metal sulfate selected from the group consisting of partially dehydrated magnesium, copper, nickel and cobalt sulfates comprising the steps of cycling the temperature of said metal sulfate, in a closed initially partially evacuated vessel, between a high temperature above the temperature of dehydration of said sulfate and a low temperature below the temperature of rehydration of said sulfate, through at least 36 cycles so that the metal sulfate takes on a morphology as shown in FIG. 3 and the specific volume of the metal sulfate substantially increases.

2. A process as recited in claim 1, wherein the metal sulfate is magnesium sulfate tetrahydrate.

3. A process as recited in claim 2, wherein the high temperature is 70° C.

4. A process as recited in claim 2, wherein the low temperature is 0° C.

5. A process as recited in claim 1, wherein the cycle time is 20 minutes at the high temperature and 20 minutes at the low temperature.

6. A process as recited in claim 1, wherein the number of cycles is at least 200.

7. A process as recited in claim 1, wherein the initial metal sulfate is produced by vacuum-dehydrating a metal sulfate of hydration higher than that of the said initial metal sulfate.

8. A process as recited in claim 1 wherein said vessel has a first zone which contains said metal sulfate and a second zone spaced from said first zone, the first zone being sequentially treated with a heating and cooling medium in each cycle and said second zone not being treated with said mediums.

9. A process as recited in claim 1 wherein the pressure in said vessel is maintained at subatmospheres.

10. A process as recited in claim 9, wherein the chamber also contains an inert gas.

11. A process as recited in claim 10, wherein the inert gas is helium present to a pressure of 100 torr.

* * * * *